(12) United States Patent
Bellouard-Drevet et al.

(10) Patent No.: US 9,499,769 B2
(45) Date of Patent: Nov. 22, 2016

(54) PROCESS FOR PREPARING POLYUREA MICROCAPSULES

(75) Inventors: Claudie Bellouard-Drevet, Geneva (CH); Damien Berthier, Geneva (CH); Marlene Jacquemond, Geneva (CH); Nicolas Pichon, Geneva (CH); Sonia Godefroy, Geneva (CH); Arnaud Struillou, Geneva (CH); Magali Lateulere, Geneva (CH); Estelle Rassat, Geneva (CH)

(73) Assignee: Firmenich SA, Geneva (CH)

( * ) Notice: Subject to any disclaimer, the term of this patent is extended or adjusted under 35 U.S.C. 154(b) by 73 days.

(21) Appl. No.: 14/128,825

(22) PCT Filed: Jan. 31, 2012

(86) PCT No.: PCT/EP2012/051572
§ 371 (c)(1),
(2), (4) Date: Dec. 23, 2013

(87) PCT Pub. No.: WO2013/000587
PCT Pub. Date: Jan. 3, 2013

(65) Prior Publication Data
US 2014/0135253 A1    May 15, 2014

(30) Foreign Application Priority Data

Jun. 28, 2011 (EP) .................... 11171696

(51) Int. Cl.
  *C11B 9/00* (2006.01)
  *B01J 13/16* (2006.01)
  *C11D 3/50* (2006.01)

(52) U.S. Cl.
  CPC ............. *C11B 9/0003* (2013.01); *B01J 13/16* (2013.01); *C11D 3/505* (2013.01)

(58) Field of Classification Search
  CPC ......... C11D 3/505; C11D 3/50; C11D 3/502; A61K 8/11; A61K 2800/412; C09D 175/02; C09D 201/00; A61Q 13/00
  USPC ........ 428/402–402.24, 403, 404, 407, 321.1, 428/474.4; 512/2, 4, 6; 427/331, 389.9, 427/212, 213–213.36, 483, 256; 264/534, 264/5, 41, 4–4.7
  See application file for complete search history.

(56) References Cited

U.S. PATENT DOCUMENTS

| | | |
|---|---|---|
| 5,225,118 A | 7/1993 | Juang et al. |
| 5,635,211 A | 6/1997 | Nehen et al. |
| 2006/0216509 A1 | 9/2006 | Kleban et al. |
| 2007/0042182 A1* | 2/2007 | Markus .................. A01N 65/00 428/402.2 |
| 2007/0202063 A1 | 8/2007 | Dihora et al. |

FOREIGN PATENT DOCUMENTS

| | | |
|---|---|---|
| EP | 1741775 B1 | 1/2007 |
| GB | 2432843 A | 6/2007 |
| GB | 2432850 A | 6/2007 |
| GB | 2432851 A | 6/2007 |
| GB | 2432852 A | 6/2007 |
| WO | WO2004/098767 A1 | 11/2004 |
| WO | WO2005/054422 A1 | 6/2005 |
| WO | WO2007/004166 A1 | 1/2007 |
| WO | WO2007/062733 A1 | 6/2007 |
| WO | WO2007/062833 A1 | 6/2007 |
| WO | WO2008/016684 A1 | 2/2008 |
| WO | WO2009/153695 A1 | 12/2009 |
| WO | WO2010/070602 A2 | 6/2010 |

OTHER PUBLICATIONS

International Search Report and Written Opinion, application PCT/EP2012/051572, mailed Feb. 6, 2012.

* cited by examiner

*Primary Examiner* — James J Seidleck
*Assistant Examiner* — S. Camilla Pourbohloul
(74) *Attorney, Agent, or Firm* — Winston & Strawn LLP

(57) ABSTRACT

The present invention relates to a process for producing microcapsules with a polyurea wall, as well as to the microcapsules themselves and consumer products comprising these microcapsules. The process of the invention uses 3,5-diamino-1,2,4-triazole as a specific polyamine for forming the wall with the polyisocyanate.

13 Claims, 1 Drawing Sheet

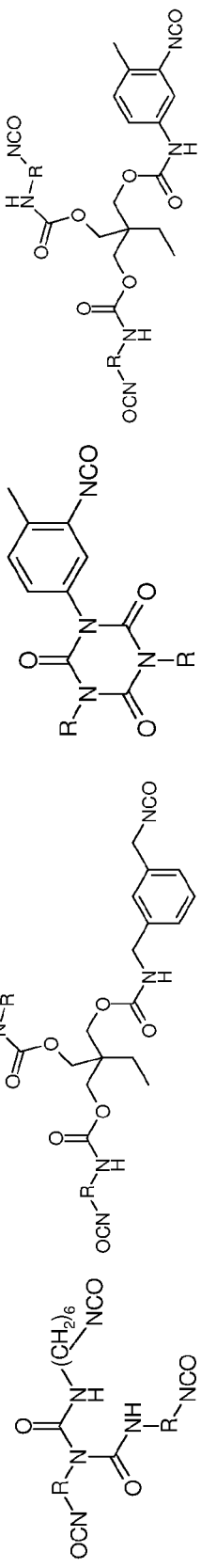

PROCESS FOR PREPARING POLYUREA MICROCAPSULES

TECHNICAL FIELD

The present invention relates to a process for producing microcapsules with a polyurea wall, as well as to the microcapsules themselves and consumer products comprising these microcapsules.

The process of the invention uses 3,5-diamino-1,2,4-triazole as a specific polyamine for forming the wall with the polyisocyanate.

BACKGROUND OF THE INVENTION AND PROBLEM TO BE SOLVED

One of the problems faced by the perfumery industry lies in the relatively rapid loss of the olfactive benefit provided by odoriferous compounds due to their volatility, particularly that of "top-notes". This problem is generally tackled using a delivery system, e.g. capsules containing a perfume, to release the fragrance in a controlled manner.

Polyurea capsules, formed by polymerisation between a polyisocyanate and a polyamine, are well known capsules that are used in a large variety of technical fields, including perfumery. Guanidine and guanidine salts are commonly used as polyamines in such capsules.

For example U.S. Pat. No. 5,635,211, US 2006/0216509, WO 2007/004166 and WO 2009/153695 all describe microcapsules having walls made of reaction products of guanidine or water-soluble guanidine salts and polyisocyanates or containing such reaction products.

Other polyamines are also used in polyurea microcapsules. For example, U.S. Pat. No. 5,225,118 discloses the use of ethylene diamine, hexamethylene diamine, diethylene triamine, triethylene tetraamine and tetraethylene pentaamine.

However, the olfactive performance of the prior art capsules still needs to be improved. Indeed the hedonic effect perceived by the consumer using a perfumed product, and therefore its perception of the quality of such a product, depends on the olfactive performance of the capsules. It is therefore desirable to provide capsules having a good olfactive performance in diverse products, including both home- and body-care products.

The present invention advantageously solves this problem by providing new polyurea microcapsules having improved olfactive performance in products such as detergents, hair care products and body lotions. Additionally the capsules of the invention have satisfying stability in consumer product bases and are even more stable than prior art capsules made with guanidine in some products, for example hair care products such as hair conditioners. To the best of our knowledge, the present solution to this problem is not described or even suggested in any prior art document.

SUMMARY OF THE INVENTION

The present invention relates to a process for preparing polyurea microcapsules. The invention concerns the capsules themselves as well as perfuming compositions and perfumed articles containing them.

DETAILED DESCRIPTION OF THE INVENTION

One object of the present invention is a process for the preparation of polyurea microcapsules comprising a) dissolving at least one polyisocyanate comprising at least two isocyanate functional groups in a perfume to form a solution;
b) adding to the mixture obtained in step a) an aqueous solution of an emulsifier or of a colloidal stabilizer;
c) adding to the mixture obtained in step b) 3,5-diamino-1,2,4-triazole to form a polyurea wall with the polyisocyanate, so as to form a microcapsules slurry;

provided that the process is carried out without any addition of amino acid.

The perfume in which the polyisocyanate is dissolved in step a) can be a perfuming ingredient alone or a mixture of ingredients in the form of a perfuming composition. Any perfuming ingredient or composition can be used. Specific examples of such perfuming ingredients may be found in the current literature, for example in Perfume and Flavour Chemicals, 1969 (and later editions), by S. Arctander, Montclair N.J. (USA), as well as in the vast patent and other literature related to the perfume industry. They are well known to the person skilled in the art of perfuming consumer products, that is, of imparting a pleasant odour to a consumer product.

The perfuming ingredients may be dissolved in a solvent of current use in the perfume industry. The solvent is preferably not an alcohol. Examples of such solvents are diethyl phthalate, isopropyl myristate, Abalyn® (rosin resins, available from Eastman), benzyl benzoate, ethyl citrate, limonene or other terpenes, or isoparaffins. Preferably, the solvent is very hydrophobic and highly sterically hindered, like for example Abalyn®. Preferably the perfume comprises less than 30% of solvent. More preferably the perfume comprises less than 20% and even more preferably less than 10% of solvent, all these percentages being defined by weight relative to the total weight of the perfume. Most preferably, the perfume is essentially free of solvent.

According to a preferred embodiment of the invention, the perfume used in the process of the invention contains less than 10% of its own weight of primary alcohols, less than 15% of its own weight of secondary alcohols and less than 20% of its own weight of tertiary alcohols. Preferably, the perfume used in the process of the invention does not contain any primary alcohols and contains less than 15% of secondary and tertiary alcohols.

According to another preferred embodiment of the invention, there is used an amount of between 25 and 60% of perfume in the process of the invention, these percentages being defined by weight relative to the total weight of the obtained microcapsules slurry.

The polyisocyanates used in the process of the invention comprise at least two isocyanate groups. Preferably they contain at least three isocyanate groups. Following these numbers of functional groups, an optimal reticulation or network of the capsules wall is achieved, providing thus microcapsules exhibiting a prolonged slow release of fragrances, as well as a good stability in the consumer product.

Low volatility polyisocyanates are preferred because of their low toxicity.

The polyisocyanate may be aliphatic, aromatic or a mixture of both aromatic and aliphatic ones. In the case of mixtures of polyisocyanates, each member of the mixture has at least two isocyanate functional groups. Preferably, the at least one polyisocyanate is in the form of a mixture of at least one aliphatic polyisocyanate and of at least one aromatic polyisocyanate, both comprising at least two isocyanate functional groups.

When mixtures of aliphatic and aromatic polyisocyanates according to any of the embodiments of the invention are used in combination with 3,5-diamino-1,2,4-triazole, the olfactive performance and stability of the capsules are optimized.

The term "aromatic polyisocyanate" is meant here as encompassing any polyisocyanate comprising an aromatic moiety. Preferably, it comprises a phenyl, a toluyl, a xylyl, a naphthyl or a diphenyl moiety, more preferably a toluyl or a xylyl moiety. Preferred aromatic polyisocyanates are biurets and polyisocyanurates, more preferably comprising one of the above-cited specific aromatic moieties. More preferably, the aromatic polyisocyanate is a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N). The chemical structures of these preferred aromatic polyisocyanates are represented in FIG. 1. In a most preferred embodiment, the aromatic polyisocyanate is a trimethylol propane-adduct of xylylene diisocyanate.

The term "aliphatic polyisocyanate" is defined as a polyisocyanate which does not comprise any aromatic moiety. Preferred aliphatic polyisocyanates are a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100), among which a biuret of hexamethylene diisocyanate is even more preferred. The chemical structure of this preferred aliphatic polyisocyanate is represented in FIG. 1.

Examples of preferred specific mixtures of at least one aliphatic polyisocyanate and of at least one aromatic polyisocyanate are a mixture of a biuret of hexamethylene diisocyanate with a trimethylol propane-adduct of xylylene diisocyanate, a mixture of a biuret of hexamethylene diisocyanate with a polyisocyanurate of toluene diisocyanate and a mixture of a biuret of hexamethylene diisocyanate with a trimethylol propane-adduct of toluene diisocyanate. Most preferably, it is a mixture of a biuret of hexamethylene diisocyanate with a trimethylol propane-adduct of xylylene diisocyanate.

In a preferred embodiment, the at least one aliphatic polyisocyanate and the at least one aromatic polyisocyanate are used in a respective molar ratio comprised between 80:20 and 10:90, preferably between 75:25 and 20:80, more preferably between 60:40 and 20:80, even more preferably between 60:40 and 30:70, most preferably between 45:55 and 30:70.

Preferably the polyisocyanate mixture is added in an amount comprised between 2 and 20% by weight, relative to the total weight of the solution obtained in step a).

In step b) of the process of the present invention an aqueous solution of an emulsifier or of a colloidal stabilizer is added to the mixture of step a). In a preferred embodiment, a dispersion or an emulsion is formed wherein droplets of the mixture obtained in step a) are dispersed throughout the aqueous solution of the emulsifier or colloidal stabilizer. For the purpose of the present invention, an emulsion is characterized by the stabilization of the oil droplets by emulsifiers, while in a dispersion the droplets are stabilized by a colloidal stabilizer. The dispersion or emulsion may be prepared by high shear mixing and adjusted to the desired droplet size. Droplet size may be checked with light scattering measurements or microscopy. Preferably an aqueous solution of a colloidal stabilizer is used and therefore a dispersion is formed.

Examples of colloidal stabilizers are polyvinyl alcohol, cellulose derivatives (such as hydroxyethyl cellulose), polyethylene oxide, copolymers of polyethylene oxide and polyethylene or polypropylene oxide, copolymers of acrylamide and acrylic acid or cationic polymers such as for example a cationic copolymer of vinylpyrrolidone and of a quaternized vinylimidazol such as those sold under the trade name Luviquat® (commercially available from BASF). Preferably, the colloidal stabilizer is polyvinyl alcohol or a cationic polymer, which is a copolymer of vinylpyrrolidone and of a quaternized vinylimidazol, or a mixture thereof.

Examples of emulsifiers are anionic surfactants such as sodium dodecyl sulfate or Stepantex® (commercially available from Stepan), non ionic surfactants such as diblock copolymers of polyethylene oxide and polyethylene or polypropylene oxide.

In step c) of the process of the invention, 3,5-diamino-1,2,4-triazole is added. The polyurea wall of the microcapsules is the result of the interfacial polymerisation between the polyisocyanate dissolved in step a) and 3,5-diamino-1,2,4-triazole added in step c).

For the purpose of the present invention, 3,5-diamino-1,2,4-triazole may be used alone, or be admixed with glycerine.

The amount of 3,5-diamino-1,2,4-triazole used is typically adjusted so that, for each mole of isocyanate group dissolved in the perfume of step a), there is added from 0.5 to 3 moles of amine groups in step c). Preferably, for each mole of isocyanate group dissolved in the perfume in step a), 1 to 3, more preferably 1 to 2 moles of amine groups are added in step c).

No specific action is required to induce the polymerisation between the polyisocyanates and 3,5-diamino-1,2,4-triazole. The reaction starts immediately after adding 3,5-diamino-1,2,4-triazole. Preferably the reaction is maintained for 2 to 15 hours, more preferably for 2 to 10 hours.

The specific composition of the polyurea wall is key in obtaining microcapsules that are at the fine balance between release and retention so as to achieve satisfactory release of fragrances, once the capsules are placed for example on textiles or hair, while showing the desired stability in the product base (e.g. counteracts efficiently the extraction of the perfume by the surfactants of the consumer product).

In an optional step of the process of the invention, the microcapsules can be isolated from the slurry. In another optional step, the microcapsules slurry can be dried in a generally known manner to form a polyurea microcapsules powder. Any drying method known to a person skilled in the art can be used and in particular the slurry may be spray dried to provide a microcapsule powder.

The microcapsules obtained by the process of any of the above-described embodiments are also an object of the present invention. Therefore the present invention provides microcapsules comprising
  a polyurea wall, which comprises the reaction product of the polymerisation between at least one polyisocyanate comprising at least two isocyanate functional groups and 3,5-diamino-1,2,4-triazole;
  a colloidal stabilizer or an emulsifier; and
  an encapsulated perfume;
provided that such capsules do not comprise any amino acid.

According to a preferred embodiment, the polyurea wall is the reaction product of the polymerisation between at least one polyisocyanate and 3,5-diamino-1,2,4-triazole.

The microcapsules obtained have an average diameter (d(v, 0.5)) comprised between 1 and 50 μm and preferably comprised between 5 and 35 μm, more preferably between 5 and 20 μm. In the present context, "average diameter" refers to the arithmetic mean. The present inventors have found that with microcapsules of this size, optimal deposition and/or adherence of microcapsules to the targeted surface, e.g. textile, hair or skin, is obtained.

The polyisocyanate, the perfume and the colloidal stabilizer or emulsifier, as well as the respective amounts of the capsules components, are as defined above in any embodiment related to the process of preparation of the microcapsules.

The microcapsules of the invention can be advantageously used for the controlled release of the encapsulated perfume. It is therefore particularly appreciated to include these microcapsules as perfuming ingredients in a perfumed consumer product.

As shown in the examples below, the polyurea microcapsules obtained by the process of the invention provide particularly good olfactive performance. They provide a controlled release of the encapsulated perfume, said perfume being slowly released from the microcapsules, thus considerably improving the perfume long-lastingness and intensity.

The capsules of the present invention also have the advantage of being stable. More preferably, the microcapsules are considered as stable when not more than 60%, most preferably not more than 50% of the initial perfume load leaks out of the capsules when they are incorporated in a consumer product, for example one of the consumer products listed below, and are stored. The storage time and temperature at which such stability is preferably reached depends on the consumer product type. Preferably, such stability results are reached after 4 weeks storage at 38° C. for home care products such as fabric softeners or detergents, and for body care products such as body wash, deodorants and antiperspirants. In hair-care products such as shampoos and hair conditioners, the storage time and temperature are preferably of at least 2 weeks at 40° C. In very aggressive bases such as body lotions, the storage time and temperature during which such stability is maintained are preferably of at least 2 days at 25° C.

A perfumed consumer product comprising the microcapsules of the invention is therefore also an object of the present invention. In particular the consumer product may be in the form of a home- or personal-care product or in the form of a fine fragrance product. Examples of personal-care products include shampoos, hair conditioners, soaps, body washes such as shower or bath salts, mousses, oils or gels, hygiene products, cosmetic preparations, body lotions, deodorants and antiperspirants. Examples of fine fragrance products include perfumes, after-shave lotions and colognes. Examples of home-care products include solid or liquid detergents, all-purpose cleaners, fabric softeners and refreshers, ironing waters and detergents, softener and drier sheets, among which liquid, powder and tablet detergents and fabric softeners are preferred. As detergents we include here products such as detergent compositions or cleaning products for washing up or for cleaning various surfaces, for example intended for the treatment of textiles or hard surfaces (floors, tiles, stone-floors, etc). Preferably the surface is a textile or skin.

Particularly preferred consumer products include powder and liquid detergents, fabric softeners, body wash, deodorants and antiperspirants, most preferably roll-on deodorants and antiperspirants, hair shampoo, hair conditioners and body lotions. Most preferred ones are powder and liquid detergents, body lotions and hair care products, such as shampoos.

The capsules slurry obtained in the process of the invention may be used as such to perfume the consumer products, in which case the reaction mixture is directly added to a consumer product as defined in any of the above embodiments. Alternatively, the microcapsules obtained in the process of the invention may be isolated from the reaction mixture before being incorporated into the consumer product. Similarly, the reaction mixture comprising the microcapsules of the invention may be mixed with or sprayed onto a dry, powdered product, such as a washing powder or powdered detergent or the microcapsules may be dried and added to these products in solid form. The microcapsules may for example be spray-dried.

Preferably, the consumer product comprises from 0.01 to 10%, more preferably from 0.05 to 2% of the microcapsules of the present invention, these percentages being defined by weight relative to the total weight of the consumer product. Of course the above concentrations may be adapted according to the olfactive effect desired in each product.

Formulations of consumer product bases in which the microcapsules of the invention can be incorporated can be found in the abundant literature relative to such products. These formulations do not warrant a detailed description here, which would in any case not be exhaustive. The person skilled in the art of formulating such consumer products is perfectly able to select the suitable components on the basis of his general knowledge and of the available literature. In particular, examples of such formulations can be found in the patents and patent applications relative to such products, for example in WO 2008/016684 (pages 10 to 14), in US 2007/0202063 (paragraphs [0044] to [0099]), in WO 2007/062833 (pages 26 to 44), in WO 2007/062733 (pages 22 to 40), in WO 2005/054422 (pages 4 to 9), in EP 1741775, in GB 2432843, in GB 2432850, in GB 2432851 or in GB 2432852.

DESCRIPTION OF THE DRAWINGS

FIG. 1: Chemical structures of 3,5-diamino-1,2,4-triazole and some examples of polyisocyanates that can be used in the present invention.

EXAMPLES

The following examples are further illustrative of the present invention embodiments, and further demonstrate the advantages of the invention capsules relative to prior art teachings.

Example 1

Preparation of Polyurea Microcapsules of the Invention

Polyurea microcapsules according to the invention (Capsules A) were prepared having the following ingredients.

TABLE 1

Composition of Capsules A

| Ingredient | Amount [g] | Molar percentage, relative to total polyisocyanate |
|---|---|---|
| Desmodur ® N 100[1] | 12.0 | 45 |
| Takenate ® D-110N[2] | 28.1 | 55 |
| Perfume[3] | 400.0 | — |
| Polyvinyl alcohol[4] | 5.5 | — |
| Tetraethyl ammonium chloride[5] | 4.0 | — |

TABLE 1-continued

Composition of Capsules A

| Ingredient | Amount [g] | Molar percentage, relative to total polyisocyanate |
|---|---|---|
| 3,5-diamino-1,2,4-triazole[6] | 6.9 | — |
| Water | 562.5 | |

[1] Biuret of hexamethylene diisocyanate, origin: Bayer
[2] Trimethylol propane-adduct of xylylene diisocyanate, origin: Mitsui Chemicals
[3] Perfuming composition of Table 1a TABLE 1a Composition of the perfume

| Ingredient | LogP | Amount [%] |
|---|---|---|
| Allyl (cyclohexyloxy)-acetate[a] | 2.72 | 1.2 |
| 2,4-Dimethyl-3-cyclohexene-1-carbaldehyde[b] | 2.85 | 1.2 |
| Menthone | 2.87 | 1.7 |
| Hedione ®[c] | 2.98 | 5.8 |
| Camphor | 3.04 | 2.9 |
| Eucalyptol | 3.13 | 5.8 |
| Dihydromyrcenol[d] | 3.47 | 11.5 |
| Rose oxyde | 3.58 | 0.9 |
| Isobornyl acetate | 3.86 | 11.5 |
| Delta damascone | 4.13 | 0.6 |
| Cashmeran ®[e] | 4.31 | 2.3 |
| Terpenyl acetate | 4.34 | 5.8 |
| Lilial ®[f] | 4.36 | 17 |
| Linalyl acetate | 4.39 | 2.3 |
| Neobutenone ® alpha[g] | 4.45 | 1.2 |
| Dihydromyrcenyl acetate | 4.47 | 2.3 |
| 2-Methylundecanal | 4.67 | 3.5 |
| Iso E Super ®[h] | 4.71 | 11.5 |
| Cetalox ®[i] | 4.76 | 0.6 |
| Isoraldeine ® 70[j] | 4.84 | 2.3 |
| Habanolide ®[k] | 4.88 | 4.6 |
| Precyclemone B[l] | 5.18 | 3.5 |
| Total | | 100.0 |

[a] Origin: Dragoco, Holzminden, Germany
[b] Origin: Firmenich SA, Geneva, Switzerland
[c] Methyl dihydrojasmonate, origin: Firmenich SA, Geneva, Switzerland
[d] Origin: International Flavors & Fragrances, USA
[e] 1,2,3,5,6,7-Hexahydro-1,2,3,3-pentamethyl-4h-inden-4-one, origin: International Flavors & Fragrances, USA
[f] 3-(4-Tert-butylphenyl)-2-methylpropanal, origin: Givaudan SA, Vernier, Switzerland
[g] 1-(5,5-Dimethyl-1-cyclohexen-1-yl)-4-penten-1-one, origin: Firmenich SA, Geneva, Switzerland
[h] 1-(Octahydro-2,3,8,8-tetramethyl-2-naphtalenyl)-1-ethanone, origin: International Flavors & Fragrances, USA
[i] Dodecahydro-3a,6,6,9a-tetramethyl-naphtho[2,1-b]furan, origin: Firmenich SA, Geneva, Switzerland
[j] 3-Methyl-4-(2,6,6-trimethyl-2cyclohexen-1-yl)-3-buten-2-one, origin: Givaudan SA, Vernier, Switzerland
[k] Pentadecenolide, origin: Firmenich SA, Geneva, Switzerland
[l] 1-Methyl-4-(4-methyl-3-pentenyl)cyclohex-3-ene-1-carboxaldehyde, origin: International Flavors & Fragrances, USA
[4] Mowiol ® 18-88, origin: Fluka
[5] Tetraethyl ammonium chloride (50% aqueous solution), origin: Fluka
[6] Origin: Alfa Aesar The Desmodur® N 100 and the Takenate® D-110N were dissolved in the perfume. This oil phase was introduced in a one liter glass double-jacketed reactor equipped with a scrapped stirrer and an Ika-rotor/stator system (6500-24000 rpm). The oil phase was stirred at 50 rpm with the scrapped stirrer for 5 minutes.

An aqueous stabilizer solution at 1% by weight, relative to the total weight of the stabilizer solution, was prepared by dissolving the polyvinyl alcohol in 543.5 g of deionised water. This solution was introduced into the reactor at room temperature and the scrapped stirrer was stopped.

A pre-emulsion was then prepared by dispersing the perfume phase in the aqueous phase with the Ika-rotor/stator system during 10 minutes at 13500 rpm.

Once the emulsion was prepared, the stirring was continued with the scrapped stirrer at 200 rpm till the end of the process.

The tetraethyl ammonium chloride solution was added to the emulsion. Then, a solution of the 3,5-diamino-1,2,4-triazole in 19 g of deionised water was added to the reactor over one hour. The temperature of the reaction mixture was kept at room temperature for two hours. The perfume content in the capsules suspension was around 40%, relative to the total weight of the suspension.

Example 2

Preparation of Polyurea Microcapsules of the Invention

Capsules B to D were prepared using the method described in Example 1. The respective amount of Desmodur® N 100 and Takenate® D-110N varied for each of these capsules as summarized in the table below.

TABLE 2

Amounts of polyisocyanates in Capsules B to D

| | Amount Desmodur® N 100[1] [g] | Amount Takenate® D-110N[2] [g] |
|---|---|---|
| Capsules B | 26.7 | 0.0 |
| Capsules C | 0.0 | 51.1 |
| Capsules D | 8.0 | 35.8 |

[1] Biuret of hexamethylene diisocyanate, origin: Bayer
[2] Trimethylol propane-adduct of xylylene diisocyanate, origin: Mitsui Chemicals Example 3

Comparative

Preparation of Polyurea Microcapsules Comprising Guanidine Carbonate as Polyamine Comparative capsules (Controls A to C) were prepared as described in Examples 1 and 2, except that 9 g of guanidine carbonate (origin: Arcos Organics) was used instead of the 3,5-diamino-1,2,4-triazole. The types and amounts of polyisocyanates in Controls A, B and C were the same as in Capsules A, B and C, respectively.

Example 4

Average Diameter of the Capsules of the Invention

The size distribution of the Capsules A to D was controlled by Optical Microscopy and Light Scattering (Mastersizer S, Malvern) and the average diameter was calculated (arithmetic mean) for each type of capsules. The results are summarized in the following table.

TABLE 3

Average diameter of Capsules A to D

| Capsules of the invention | Average diameter d(v, 0.5) [μm] |
|---|---|
| Capsules A | 5 |
| Capsules B | 5 |

TABLE 3-continued

Average diameter of Capsules A to D

| Capsules of the invention | Average diameter d(v, 0.5) [μm] |
|---|---|
| Capsules C | 5 |
| Capsules D | 5 |

Example 5

Preparation of a Fabric Softener Comprising the Polyurea Microcapsules of the Invention A concentrated unperfumed fabric softener base was prepared by admixing the ingredients listed in Table 4, in the amounts indicated. The percentages are defined by weight relative to the total weight of the unperfumed fabric softener base.

TABLE 4

Formulation of the concentrated unperfumed fabric softener base

| Ingredient | % |
|---|---|
| Stepantex ® VL90 A Diester Quat[1] | 16.50 |
| Proxel GXL[2] | 0.04 |
| CaCl$_2$ (10% aqueous solution) | 0.20 |
| Water | 83.26 |

[1]Origin: Stepan
[2]Origin: Avecia

Softeners A to D were prepared by adding Capsules A to D at 1.26% by weight, relative to the total weight of the softener, under gentle shaking into the unperfumed softener base of Table 4.

Example 6

Stability of the Polyurea Microcapsules of the Invention in a Fabric Softener Base The storage stability of the capsules in Softeners A, C and D was evaluated. The softeners comprising the capsules were stored during one month at 38° C. and the amount of perfume having leaked out of the capsules was measured by solvent extraction and GC-MS analysis. The results are summarized in the following table.

TABLE 5

Storage stability of the capsules in Softeners A, C and D

| Fabric softener of the invention | Amount of perfume that leaked out of the capsules [%] |
|---|---|
| Softener A | 11 |
| Softener C | 5 |
| Softener D | 8 |

The capsules of the invention are therefore stable in a fabric softener base.

Example 7

Preparation of a Concentrated Liquid Detergent Comprising the Polyurea Microcapsules of the Invention Liquid Detergents A to D were prepared by mixing Capsules A to D at 0.275% by weight, relative to the total weight of the detergent with the commercially available unperfumed concentrated liquid detergent base Tide® 2×HE Free of perfume and dye (trademark of Procter and Gamble, USA).

Example 8

Comparative

Preparation of a Concentrated Liquid Detergent Comprising the Polyurea Microcapsules of Example 3

Control Liquid Detergents A to C were prepared by mixing Controls A to C at 0.275% by weight, relative to the total weight of the detergent with the commercially available unperfumed concentrated liquid detergent base Tide® 2×HE Free of perfume and dye (trademark of Procter and Gamble, USA).

Example 9

Olfactive Performance of the Polyurea Microcapsules of the Invention in Concentrated Liquid Detergent The olfactive performance of Capsule A, as well as that of Control A was then evaluated in the corresponding concentrated liquid detergents of Examples 7 and 8.

Fabrics (2.5 kg of cotton terry towels) were washed at 40° C. in a standard European horizontal axis machine. There were dispensed 80 g of freshly prepared detergent at the start of the wash through the detergent drawer. After the wash, fabrics were line-dried and the odour intensity of the cotton towels was evaluated by a panel of 20 trained panelists, after 1 day drying. The panelists were asked to rate the odour intensity of the towels after gentle rubbing of the fabrics by hand on a scale from 1 to 7, 1 corresponding to odorless and 7 corresponding to a very strong odour. The results are shown in Table 6.

TABLE 6

Olfactive performance of Capsule A and of Control A in concentrated liquid detergent

| Capsule of the invention | Olfactive performance of the capsules of the invention | Olfactive performance of the Control | Corresponding Control |
|---|---|---|---|
| Capsules A | 4.6 | 4.2 | Control A |

It is clear from these results that, after rubbing, the perfume intensity was more intense on fabrics washed with the liquid detergent containing the capsules of the invention, than on fabrics washed with the liquid detergent containing the control capsules.

Therefore, the perfume is perceived more intensely when the capsules are made with 3,5-diamino-1,2,4-triazole than when they are made with guanidine carbonate.

Example 10

Stability of the Polyurea Microcapsules of the Invention in a Concentrated Liquid Detergent The storage stability of the capsules in Liquid Detergents A, C and D was evaluated. The detergents comprising the capsules were stored during four weeks at 38° C. and the amount of perfume having leaked out of the capsules was measured by solvent extraction and GC-MS analysis. The results are summarized in the following table.

TABLE 7

Storage stability of the capsules of the invention in Liquid Detergents A, C and D

| Liquid detergent of the invention | Amount of perfume that leaked out of the capsules [%] |
|---|---|
| Liquid Detergent A | 26 |
| Liquid Detergent C | 9 |
| Liquid Detergent D | 19 |

It is apparent from these results that the capsules of the present invention are stable in the concentrated liquid detergent base.

Example 11

Preparation of a Concentrated Powder Detergent Comprising the Polyurea Microcapsules of the Invention Powder Detergents A to D were prepared by mixing Capsules A to D at 0.275% by weight, relative to the total weight of the detergent into the commercially available unperfumed concentrated powder detergent base Ultra Tide® Free and Gentle (trademark of Procter and Gamble, USA).

Example 12

Comparative

Preparation of a Concentrated Powder Detergent Comprising the Polyurea Microcapsules of Example 3

Control Powder Detergents A to C were prepared by adding Controls A to C at 0.275% by weight, relative to the total weight of the detergent into the commercially available unperfumed concentrated powder detergent base Ultra Tide® Free and Gentle (trademark of Procter and Gamble, USA).

Example 13

Olfactive Performance of the Polyurea Microcapsules of the Invention in Concentrated Powder Detergent The olfactive performance of Capsules A and B as well as that of Controls A and B was then evaluated in the corresponding concentrated powder detergents of Examples 11 and 12.

Fabrics (2.5 kg of cotton terry towels) were washed at 40° C. in a standard European horizontal axis machine. There were dispensed 50 g of freshly prepared detergent at the start of the wash through the detergent drawer. After the wash, fabrics were line-dried and the odour intensity of the cotton towels was evaluated by a panel of 20 trained panelists, after 1 day drying. The panelists were asked to rate the odour intensity of the towels after gentle rubbing of the fabrics by hand on a scale from 1 to 7, 1 corresponding to odorless and 7 corresponding to a very strong odour. The results are shown in Table 8.

TABLE 8

Olfactive performance of Capsules A and B and of Controls A and B in concentrated powder detergent

| Capsule of the invention | Olfactive performance of the capsules of the invention | Olfactive performance of the Control | Corresponding Control |
|---|---|---|---|
| Capsules A | 4.6 | 4.2 | Control A |
| Capsules B | 3.0 | 3.0 | Control B |

It is clear from these results that, after rubbing, the perfume intensity was more intense on fabrics washed with the powder detergent containing the capsules of the invention, than on fabrics washed with the powder detergent containing the control capsules.

Therefore, the perfume is perceived more intensely when the capsules are made with 3,5-diamino-1,2,4-triazole than when they are made with guanidine carbonate.

Example 14

Preparation of a Body Wash Comprising the Polyurea Microcapsules of the Invention A body wash formulation was prepared by admixing the ingredients listed in Table 9, in the amounts indicated. The percentages are defined by weight relative to the total weight of the body wash formulation.

TABLE 9

Composition of the body wash formulation

| Ingredient | Amount [%] w/w |
|---|---|
| Carbopol ® Aqua CC polymer[1] | 8.0 |
| Citric acid (40% solution in water) | 0.5 |
| Zetesol AO 328 U[2] | 25.0 |
| Tego Betain F 50[3] | 4.0 |
| Glydant Plus Liquid[4] | 0.1 |
| Sodium Chloride (20% solution in water) | 4.0 |
| Water | 58.4 |

[1]Polyacrylate-1 crosspolymer, origin: Noveon
[2]Sodium $C_{12}$-$C_{15}$ pareth sulfate, origin: Zschimmer & Schwarz
[3]Cocamidopropyl betaine, origin: Goldschmidt AG
[4]DMDM hydantoin and iodopropynyl butylcarbamate, origin: Lonza Body Washes A to D were prepared by mixing Capsules A to D at 0.5% by weight, relative to the total weight of the body wash into the body wash formulation prepared above.

Example 15

Stability of the Polyurea Microcapsules of the Invention in a Body Wash Base

The storage stability of the capsules in Body-Washes A to D was evaluated. The body-washes were stored for 4 weeks at 45° C. and the amount of perfume having leaked out of the capsules was measured by SPME and GC-MS analysis. The results are summarized in the following table.

TABLE 10

Storage stability of the capsules of the invention in Body-Washes A to D

| Body-Wash of the invention | Amount of perfume that leaked out of the capsules [%] |
|---|---|
| Body-Wash A | 3 |
| Body-Wash B | 16 |
| Body-Wash C | 4 |
| Body-Wash D | 3 |

It is apparent from these results that the capsules of the present invention are stable in the body wash base.

Example 16

Preparation of a Roll-on Antiperspirant Deodorant Product Comprising the Polyurea Microcapsules of the Invention A roll-on antiperspirant deodorant emulsion formulation was prepared by admixing the ingredients listed in Table 11, in the amounts indicated. The percentages are defined by weight relative to the total weight of the roll-on antiperspirant deodorant formulation.

TABLE 11

Composition of the roll-on antiperspirant deodorant formulation

| Ingredient | Amount [%] w/w |
|---|---|
| Brij 72[1] | 3.25 |
| Brij 721[2] | 0.75 |
| Arlamol E[3] | 4.00 |
| Locron L[4] | 40.00 |
| Water | 52.00 |

[1] Origin: Croda
[2] Origin: Croda
[3] Origin: Croda
[4] Origin: Clariant

Deodorants A to D were prepared by mixing Capsules A to D at 1.26% by weight, relative to the total weight of the roll-on antiperspirant deodorant into the roll-on antiperspirant emulsion formulation prepared above.

Example 17

Stability of the Polyurea Microcapsules of the Invention in a Roll-on Antiperspirant Deodorant The storage stability of the capsules in Deodorants A to D was evaluated. The deodorants were stored for 4 weeks at 45° C. and the amount of perfume having leaked out of the capsules was measured by SPME and GC-MS analysis. The results are summarized in the following table.

TABLE 12

Storage stability of the capsules of the invention in Deodorants A to D

| Deodorant of the invention | Amount of perfume that leaked out of the capsules [%] |
|---|---|
| Deodorant A | 10 |
| Deodorant B | 55 |
| Deodorant C | 7 |
| Deodorant D | 7 |

It is apparent from these results that the capsules of the present invention are stable in the roll-on antiperspirant deodorant base.

Example 18

Preparation of a Hair Shampoo Comprising the Polyurea Microcapsules of the Invention A hair shampoo formulation was prepared by admixing the ingredients listed in Table 13, in the amounts indicated. The percentages are defined by weight relative to the total weight of the hair shampoo formulation.

TABLE 13

Composition of the hair shampoo formulation

| Ingredient | Amount [%] w/w |
|---|---|
| Jaguar C-14S[1] | 0.4 |
| Dehyton AB-30[2] | 7.0 |
| Texapon NSO IS[3] | 45.0 |
| Dow Corning 2-1691 emulsion | 3.0 |
| Cutina AGS[4] | 0.9 |
| Rewomid IPP 240[5] | 1.2 |
| Cetyl alcohol | 1.2 |
| Glydant plus liquid[6] | 0.3 |
| Water | 41.0 |

[1] Origin: Rhodia
[2] Origin: Cognis
[3] Origin: Cognis
[4] Origin: Cognis
[5] Origin: Degussa
[6] Origin: Lonza Shampoos A to D were prepared by mixing Capsules A to D at 0.5% by weight, relative to the total weight of the shampoo into the hair shampoo formulation prepared above.

Example 19

Comparative

Preparation of a Hair Shampoo Comprising the Polyurea Microcapsules of Example 3

Control Shampoos A to C were prepared by adding Controls A to C at 0.5% by weight, relative to the total weight of the hair shampoo into the hair shampoo formulation prepared in Example 18.

Example 20

Olfactive Performance of the Polyurea Microcapsules of the Invention in Hair Shampoo The olfactive performance of Capsules A to C as well as that of Controls A to C was then evaluated in the corresponding hair shampoo of Examples 18 and 19.

A 10 g hair swatch was first washed with 2.5 g of the shampoo, rinsed for 30 seconds under tap water at 37° C. before repeating the same wash/rinse operation a second time. The hair swatch was then left to dry for 6 hours at room temperature before evaluating.

The intensity of the perception of the perfume on the hair swatches washed with the shampoos was evaluated by a panel of 10 trained panelists. They were asked to comb gently the hair swatches 3 times and then to rate the intensity of the perfume perception on a scale ranging from 1 to 7, wherein 1 means no odour and 7 means very strong odour.

TABLE 14

Olfactive performance of Capsules A to C and of Controls A to C in hair shampoo

| Capsule of the invention | Olfactive performance of the capsules of the invention | Olfactive performance of the Control | Corresponding Control |
| --- | --- | --- | --- |
| Capsules A | 3.2 | 2.8 | Control A |
| Capsules B | 2.9 | 2.6 | Control B |
| Capsules C | 2.6 | 2.5 | Control C |

It is clear from these results that, after rubbing, the perfume intensity was more intense on hair washed with the shampoo containing the capsules of the invention, than on hair washed with the shampoo containing the control capsules.

Therefore, the perfume is perceived more intensely when the capsules are made with 3,5-diamino-1,2,4-triazole than when they are made with guanidine carbonate.

Example 21

Stability of the Polyurea Microcapsules of the Invention in a Hair Shampoo

The storage stability of the capsules in Shampoos A to D was evaluated. The hair shampoos were stored for 2 weeks at 40° C. and the amount of perfume having leaked out of the capsules was measured by SPME and GC-MS analysis. The results are summarized in the following table.

TABLE 15

Storage stability of the capsules of the invention in Shampoos A to D

| Shampoo of the invention | Amount of perfume that leaked out of the capsules [%] |
| --- | --- |
| Shampoo A | 6 |
| Shampoo B | 27 |
| Shampoo C | 3 |
| Shampoo D | 5 |

It is apparent from these results that the capsules of the present invention are stable in the hair shampoo base.

Example 22

Preparation of a Rinse-Off Hair Conditioner Comprising the Polyurea Microcapsules of the Invention Rinse-off hair conditioners (herein after Rinse-Off) A to D were prepared by mixing Capsules A to D at 0.5% by weight, relative to the total weight of the rinse-off hair conditioner into the commercially available Pantene® rinse-off hair conditioner formulation (trademark of Procter and Gamble, USA).

Example 23

Stability of the Polyurea Microcapsules of the Invention in a Rinse-Off Hair Conditioner Base The storage stability of the capsules in Rinse-Off A, C and D was evaluated. The rinse-off comprising the capsules were stored during two weeks at 40° C. and the amount of perfume having leaked out of the capsules was measured by solvent extraction and GC-MS analysis. The results are summarized in the following table.

TABLE 16

Storage stability of the capsules of the invention in Rinse-off A, C and D

| Rinse-off of the invention | Amount of perfume that leaked out of the capsules [%] |
| --- | --- |
| Rinse-off A | 53 |
| Rinse-off C | 25 |
| Rinse-off D | 39 |

It is apparent from these results that the capsules of the present invention are stable in the rinse-off hair conditioner base.

Example 24

Preparation of a Leave-on Hair Conditioner Comprising the Polyurea Microcapsules of the Invention A leave-on hair conditioner formulation was prepared by admixing the ingredients listed in Table 17, in the amounts indicated. The percentages are defined by weight relative to the total weight of the leave-on hair conditioner formulation.

TABLE 17

Composition of the leave-on hair conditioner formulation

| Ingredient | Amount [%] w/w |
| --- | --- |
| Water | 95.5 |
| Mirasil ADM-E[1] | 1.5 |
| Salcare SC 91[2] | 1.0 |
| Aculyn 46[3] | 1.0 |
| Wacker-Belsil DMC 6038[4] | 0.5 |
| Phenonip[5] | 0.5 |

[1]Origin: Rhodia
[2]Origin: Ciba
[3]Origin: Rohm & Haas
[4]Origin: Wacker
[5]Origin: Clariant Leave-On Hair Conditioners (herein after Leave-On) A to D were prepared by mixing Capsules A to D at 0.26% by weight, relative to the total weight of the leave-on hair conditioner into the leave-on hair conditioner formulation prepared above.

Example 25

Comparative

Preparation of a Leave-on Hair Conditioner Comprising the Polyurea Microcapsules of Example 3

Control Leave-On Hair Conditioners (herein after Leave-On) A to C were prepared by adding Controls A to C at 0.26% by weight, relative to the total weight of the leave-on hair conditioner into the leave-on hair conditioner formulation prepared in Example 24.

Example 26

Stability of the Polyurea Microcapsules of the Invention in a Leave-on Hair Conditioner Base The storage stability of the capsules in Leave-on A to D and in control Leave-on A to C was evaluated. The leave-on hair conditioners comprising the capsules were stored during two weeks at 45° C. and the amount of perfume having leaked out of the capsules was measured by solvent extraction and GC-MS analysis. The results are summarized in the following table.

TABLE 18

Storage stability of the capsules of the invention in Leave-on A to D

| Leave-On of the invention | Amount of perfume that leaked out of the capsules [%] | Amount of perfume that leaked out of the control capsules [%] | Control Leave-On |
|---|---|---|---|
| Leave-On A | 7 | 18 | Control A |
| Leave-On B | 54 | 73 | Control B |
| Leave-On C | 5 | 7 | Control C |
| Leave-On D | 8 | | |

It is apparent from these results that the capsules of the present invention are more stable in the concentrated leave-on hair conditioner base than the corresponding controls made with guanidine.

Example 27

Preparation of a Body Lotion Comprising the Polyurea Microcapsules of the Invention Body Lotions A to D were prepared by dispersing Capsules A to D at 1.25% by weight, relative to the total weight of the body lotion into a commercially available body lotion formulation (Bath & Body Work, USA).

Example 28

Comparative

Preparation of a Body Lotion Comprising the Polyurea Microcapsules of Example 3

Control Body Lotions A to C were prepared by dispersing Capsules A to C at 1.25% by weight, relative to the total weight of the body lotion into a commercially available body lotion formulation (origin: Bath & Body Work, USA).

Example 29

Olfactive Performance of the Polyurea Microcapsules of the Invention in Body Lotion The olfactive performance of Capsules A to C as well as that of Controls A to C was then evaluated in the corresponding body lotions of Examples 27 and 28.

An amount of 0.15 g of each body lotion was spread on a paper blotter (4.5 cm*12 cm) and left to dry for 1 hour at room temperature before evaluating.

The intensity of the perception of the perfume on the blotters treated with the above body-lotions was evaluated by a panel of 10 trained panelists. They were asked to rub gently the blotters with one finger and then to rate the intensity of the perfume perception on a scale ranging from 0 to 10, wherein 0 means no odour and 10 means very strong odour. The results are summarized in the following table.

TABLE 19

Olfactive performance of Capsules A to C and of Controls A to C in body lotion

| Capsule of the invention | Olfactive performance of the capsules of the invention | Olfactive performance of the Control | Corresponding Control |
|---|---|---|---|
| Capsules A | 8.0 | 7.0 | Control A |
| Capsules B | 7.0 | 6.1 | Control B |
| Capsules C | 7.5 | 5.3 | Control C |

It is clear from these results that, after rubbing, the perfume intensity was more intense on blotters treated with the body lotion containing the capsules of the invention, than on blotters treated with the body lotion containing the control capsules.

Therefore, the perfume is perceived more intensely when the capsules are made with 3,5-diamino-1,2,4-triazole than when they are made with guanidine carbonate.

Example 30

Stability of the Polyurea Microcapsules of the Invention in a Body Lotion

The storage stability of the capsules in Body Lotions A, C and D was evaluated. The body lotions were stored for 2 days at 25° C. and the amount of perfume having leaked out of the capsules was measured by SPME and GC-MS analysis. The results are summarized in the following table.

TABLE 20

Storage stability of the capsules of the invention in Body Lotions A, C and D.

| Body Lotion of the invention | Amount of perfume that leaked out of the capsules [%] |
|---|---|
| Body Lotion A | 15 |
| Body Lotion C | 4 |
| Body Lotion D | 8 |

It is apparent from these results that the capsules of the present invention are stable in the body lotion base.

What is claimed is:

1. A process for the preparation of polyurea microcapsules comprising
    a) dissolving at least one polyisocyanate comprising at least two isocyanate functional groups, in a perfume to form a solution;
    b) adding to the solution obtained in step a) an aqueous solution of an emulsifier or of a colloidal stabilizer;
    c) adding to the mixture obtained in step b) 3,5-diamino-1,2,4-triazole to form a polyurea wall with the polyisocyanate wherein the polyurea wall encapsulates the perfume, so as to form a microcapsules slurry;
    wherein the process is carried out without any addition of amino acid; and
    wherein the microcapsules have greater stability in consumer products and improved perfume release compared to microcapsules that are not made with 3,5-diamino-1,2,4-triazole with the stability of the microcapsules being determined as not more than 60% of the perfume leaking out of the microcapsules when incorporated in a consumer product for a particular storage time and temperature, with the microcapsules being stable after 4 weeks storage at 38° C. in fabric softeners, detergents, body washes, deodorants or antiperspirants, for least 2 weeks storage at 40° C. in shampoos or hair conditioners, and for at least 2 days at 25° C. in body lotions.

2. A process according to claim 1, for the preparation of polyurea microcapsules comprising:
    a) dissolving at least one polyisocyanate comprising at least two isocyanate functional groups, in a perfume to form a solution, wherein the at least one polyisocyanate is in the form of a mixture of at least one aliphatic polyisocyanate and of at least one aromatic polyisocyanate, both comprising at least two isocyanate functional groups;
    b) adding to the solution obtained in step a) an aqueous solution of an emulsifier or of a colloidal stabilizer;
    c) adding to the mixture obtained in step b) 3,5-diamino-1,2,4-triazole to form a polyurea wall with the polyisocyanates wherein the polyurea wall encapsulates the perfume, so as to form a microcapsules slurry;
    wherein the process is carried out without any addition of amino acid; and
    wherein the microcapsules have greater stability in consumer products and improved perfume release compared to microcapsules that are not made with 3,5-diamino-1,2,4-triazole.

3. The process according to claim 2, wherein the aliphatic polyisocyanate and the aromatic polyisocyanate are used in a respective molar ratio ranging from 80:20 to 10:90.

4. The process according to claim 3, wherein the aliphatic polyisocyanate and the aromatic polyisocyanate are used in a respective molar ratio comprised between 60:40 and 20:80 and the polyurea microcapsules have an average diameter between 1 and 50 µm, between 5 and 35 µm, or between 5 and 20 µm.

5. The process according to claim 1, wherein there is used an amount of between 25 and 60% of perfume, these percentages being defined by weight relative to the total weight of the obtained microcapsules slurry.

6. The process according to claim 1, wherein the polyisocyanates comprise at least three isocyanate functional groups.

7. The process according to claim 2, wherein the aromatic polyisocyanate comprises a phenyl, a toluyl, a xylyl, a naphthyl or a diphenyl moiety.

8. The process according to claim 2, wherein the aromatic polyisocyanate is selected from the group consisting of a polyisocyanurate of toluene diisocyanate, a trimethylol propane-adduct of toluene diisocyanate and a trimethylol propane-adduct of xylylene diisocyanate.

9. The process according to claim 2, wherein the aliphatic polyisocyanate is selected from the group consisting of a trimer of hexamethylene diisocyanate, a trimer of isophorone diisocyanate and a biuret of hexamethylene diisocyanate.

10. The process according to claim 2, wherein the mixture of an aliphatic polyisocyanate and of an aromatic polyisocyanate is a mixture of a biuret of hexamethylene diisocyanate with a trimethylol propane-adduct of xylylene diisocyanate.

11. The process according to claim 1, wherein the polyisocyanate is used in an amount comprised between 2 and 20% by weight, relative to the total weight of the solution obtained in step a).

12. The process according to claim 1, wherein the colloidal stabilizer is polyvinyl alcohol, a cellulose derivative, polyethylene oxide, a copolymer of polyethylene oxide and polyethylene or polypropylene oxide, a copolymer of acrylamide and acrylic acid, a cationic polymer or a mixture thereof.

13. The process according to claim 12, wherein the colloidal stabilizer is polyvinyl alcohol or a cationic polymer, which is a copolymer of vinylpyrrolidone and of a quaternized vinylimidazol, or a mixture thereof.

* * * * *